Patented Nov. 7, 1933

1,933,585

UNITED STATES PATENT OFFICE 1,933,585

AZO DYES AND THEIR PRODUCTION

Rainald Brightman and William Leslie Baber Wellacott, Blackley, Manchester, England, assignors to Imperial Chemical Industries Limited, Westminister, England No Drawing. Application February 19, 1930, Serial No. 429,810, and in Great Britain March 5, 1929

11 Claims. (Cl. 260—85)

According to this invention disazo dyes which have the valuable property of dyeing a regenerated cellulose rayon, as for example, viscose rayon, in even shades are obtained by tetrazotizing 3:3'-diaminodiphenyl-urea or a substitution product thereof, other than a carboxylic or sulphonic acid derivative, and combining with 1 molecular proportion of a sulphonic or carboxylic acid of a phenol or a naphthol and one molecular proportion of a naphthylamine, naphthol or an N-substituted derivative of an aminonaphthol sulphonic acid. Alternatively we may obtain certain of the same dyestuffs by coupling one molecular proportion of diazotized meta-nitroaniline or a derivative thereof with carboxylic or sulphonic acid of a phenol or a naphthol or with an N-substituted naphthylamine sulphonic acid, reducing the nitro azo dyestuff and treating with carbonyl chloride the resultant aminoazo dyestuff, either alone or mixed with an equi-molecular proportion of another amino-azo dyestuff similarly prepared from diazotized meta-nitroaniline and another carboxylic or sulphonic acid derivative of a phenol or a naphthol or an N-substituted amino-naphthol- or naphthylamine-sulphonic acid. Further, we may obtain dyestuffs having the same or similar properties by replacing the m-nitroaniline by for instance m-aminoacetanilide or a derivative thereof, hydrolyzing the acylaminoazo dyestuff and treating with carbonylchloride the aminoazo dyestuff, either alone or in admixture with other aminoazo dyestuff as described above in the case of the diazotized m-nitroaniline derivative.

The use of certain disazo derivatives of 3:3'-diaminodiphenyl urea as direct cotton colours has already been described, for instance, in specification E. P. 10,380/1913, in which is disclosed the manufacture of disazo dyes having affinity for unmordanted cotton obtained by coupling a tetrazotized 3:3'- or 4:4'-diaminodiphenylurea with one molecule of resorcinol and one molecule of an aminonaphthol sulphonic acid.

It is not disclosed, however, that in their behaviour in the dyeing of a regenerated cellulose rayon such as viscose rayon, there is the remarkable difference in dyeing properties between the disazo derivatives of 3:3'-diaminodiphenyl-urea and of 4:4'-diaminodiphenylurea which we have found in our experiments. Whereas the disazo derivatives of 4:4'-diaminodiphenyl-urea resemble the majority of substantive cotton dyeings in giving uneven dyeings on viscose rayon the disazo derivatives of 3:3'-diaminodiphenylurea such as are herein described possess the valuable property of dyeing such as regenerated cellulose rayon in even shades. This invention is accordingly of great value in the art of dyeing such fibres.

We have not described or claimed the dyes which may be derived from tetrazotized 3:3'-diaminodiphenylurea and two molecular proportions of the same or different aminonaphthol sulphonic acids for we do not find these give the results described in the present invention. Thus the dyestuff obtained from one molecular proportion each of 1:8-aminonaphthol-4-sulphonic acid and 2:8-aminonaphthol-6-sulphonic acid dyes viscose rayon uneven reddish violet shades.

The dyes of our invention may all be represented by the following generic formula

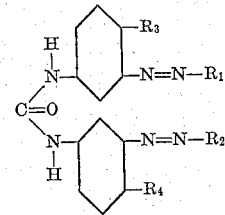

wherein $R_1$ represents a coupled residue of a sulphonic or carboxylic acid derivative of a phenol or a naphthol, $R_2$ represents a coupled residue of a naphthylamine, a naphthol, an N-substituted aminonaphthol sulphonic acid or an N-substituted naphthylamine sulphonic acid, and $R_3$ and $R_4$ represent hydrogen or a substituent such as an alkoxy group.

The invention is illustrated by the following examples, to which it is not limited, the parts being by weight.

Example 1

242 parts of 3: 3'-diaminodiphenylurea are tetrazotized with 138 parts of sodium nitrite and 500 parts of 36 per cent hydrochloric acid. The tetrazo solution is stirred into a cold solution containing 160 parts of sodium salicylate and 600 parts of sodium carbonate. The coupling mixture is stirred until combination is complete when there is run in a solution containing 239 parts of 2-amino-8-naphthol-6-sulphonic acid. The mixture is maintained alkaline and after stirring to complete the coupling it is heated up and the dyestuff isolated by the addition of common salt. It dyes viscose rayon a yellowish brown shade. If in place of 239 parts of 2-amino-8-naphthol-6-sulphonic acid there is added a solution containing 315 parts of 2-phenyl-amino- 8-naphthol-6-sulphonic acid there is obtained a dyestuff giving brown shades on viscose rayon.

Example 2

242 parts of 3:3'-diaminodiphenylurea are tetrazotized with 138 parts of sodium nitrite and 500 parts of 36 per cent hydrochloric acid. The tetrazo solution is run into a cold, well stirred solution containing 224 parts of 1-naphthol-4-sulphonic acid and 750 parts of sodium carbonate. The coupling mixture is stirred until combination is complete. A solution containing 337 parts of the sodium salt of 2-phenylamino-5-naphthol-7-sulphonic acid is now run in and stirring continued until the second stage of coupling is complete, the mixture being maintained cold and alkaline throughout. The mixture is then heated up and the dyestuff salted out by the addition of common salt. It dyes viscose rayon a bluish red shade.

Example 3

138 parts of meta-nitroaniline are diazotized with 250 parts of 36 per cent hydrochloric acid and 69 parts of sodium nitrite in the known manner. The diazo solution is stirred into a well cooled solution of 138 parts of salicylic acid in 40 parts of sodium hydroxide containing 350 parts of sodium carbonate. After stirring until coupling is complete the mixture is heated up and a solution containing 360 parts of sodium sulphide crystals is added and stirring continued until reduction of the nitro azo dyestuff to aminoazo dyestuff is complete.

Simultaneously with the above operations the diazo solution obtained from a further 138 parts of m-nitroaniline is combined with 320 parts of 1:8-dihydroxynaphthalene-3:6-disulphonic acid (chromotropic acid) in the presence of about 400 parts of sodium carbonate and the nitroazo dyestuff thus obtained is reduced in like manner with a solution containing about 360 parts of sodium sulphide crystals.

The solutions of the two aminoazo dyestuffs are now mixed and neutralized, 300 parts of sodium acetate crystals are added and a slow stream of carbonyl chloride is passed into the mixture. Sodium hydroxide solution is added gradually to keep the mixture free from mineral acidity and when the conversion of the aminoazo dyes to the urea is complete, the current of carbonyl chloride is stopped and the mixture made alkaline. Upon heating up and adding common salt there separates a dyestuff which dyes viscose rayon a bluish red shade.

If in place of 138 parts of salicylic acid in the above example there are used 224 parts of 1-naphthol-4-sulphonic acid and in place of 320 parts of 1:8-dihydroxy-naphthalene-3:6-disulphonic acid 3:5 parts of 2-phenylamino-8-naphthol-6-sulphonic acid there is obtained a dyestuff dyeing a viscose rayon a brown shade.

The following tables illustrate further dyestuffs which may be obtained according to our invention.

| Tetrazotized and coupled with | Coupling component (1 mol. of each) | Shade on viscose rayon |
|---|---|---|
| 3:3'-diaminodiphenyl urea. | Salicylic acid. 1-amino-5-naphthol-7-sulphonic acid. | Maroon |
| 3:3'-diaminodiphenyl urea. | Salicylic acid. 2-benzoylamino-5-naphthol-7-sulphonic acid. | Orange |
| 3:3'-diaminodiphenyl urea. | o-Cresotinic acid. 2-benzoylamino-8-naphthol-6-sulphonic acid. | Yellowish-pink |

| Diazotized and coupled with | Coupling component | | |
|---|---|---|---|
| m-aminoacetanilide | 2-naphthol-7-sulphonic acid, hydrolyzed. | Phosgenated | |
| m-nitroaniline | 2-phenylamino-5-naphthol-7-sulphonic acid, reduced. | Brownish-red | |
| 4-nitro-2-anisidine | Salicylic acid, reduced. | Phosgenated | |
| m-aminoacetanilide | 2-phenylamino-8-naphthol-6-sulphonic acid, hydrolyzed. | Brown | |
| 4-nitro-2-anisidine | 2-naphthol-7-sulphonic acid, reduced. | Phosgenated | |
| | | Reddish-violet | |

Having now particularly described and ascertained the nature of our said invention and in what manner the same is to be performed we declare that what we claim is:—

1. As new products, the disazo dyes which are capable of dyeing regenerated cellulose materials in even level shades and which may be represented by the probable formula:

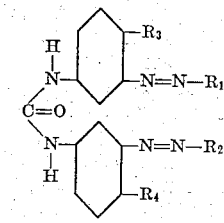

wherein $R_1$ represents a coupled residue of an azo dye coupling component selected from the class consisting of mono-hydroxy-benzenes and naphthols having a sulphonic or carboxylic acid group substituted thereon, $R_2$ represents a coupled residue of an azo dye coupling component selected from the class consisting of 2-amino-8-naphthol-6-sulphonic acid, 2-phenylamino-8-naphthol-6-sulphonic acid, 2-phenylamino-5-naphthol-7-sulphonic acid, 1:8-dihydroxy-naphthalene-3:6-disulphonic acid, 1-amino-5-naphthol-7-sulphonic acid, 2-benzoylamino-5-naphthol-7-sulphonic acid and 2-benzoylamino-8-naphthol-6-sulphonic acid, and $R_3$ and $R_4$ represent hydrogen or an alkoxy group.

2. As new products, the disazo dyes which are capable of dyeing regenerated cellulose materials in even level shades and which may be represented by the probable formula

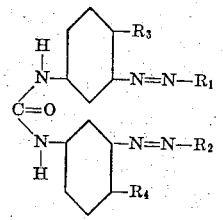

wherein $R_1$ represents a coupled residue of an azo dye coupling component selected from the class consisting of salicylic acid, 1-naphthol-4-sulphonic acid, o-cresotinic acid and 2-naphthol-7-sulphonic acid, $R_2$ represents a coupled residue of an azo dye coupling component selected from the class consisting of 2-amino-8-naphthol-6-sulphonic acid, 2-phenylamino-8-naphthol-6-sulphonic acid, 2-phenylamino-5-naphthol-7-sulphonic acid, 1:8-dihydroxy-naphthalene-3:6-disulphonic acid, 1-amino-5-naphthol-7-sulphonic acid, 2-benzoylamino-5-naphthol-7-sulphonic acid and 2-benzoylamino-8-naphthol-6-sulphonic acid, and $R_3$ and $R_4$ represent hydrogen or an alkoxy group, the said dyes dyeing regenerated cellulose in even level shades varying from brown to bluish-red.

3. As new products, the disazo dyes which are capable of dyeing regenerated cellulose materials in even level shades and which may be represented by the probable formula

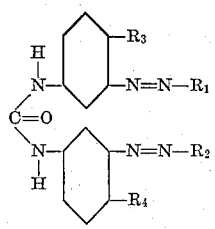

wherein $R_1$ represents the coupled residue of salicylic acid, $R_2$ represents a coupled residue of an azo dye coupling component selected from the class consisting of 2-amino-8-naphthol-6-sulphonic acid, 2-phenylamino-8-naphthol-6-sulphonic acid, 2-benzoylamino-5-naphthol-7-sulphonic acid, 1-amino-5-naphthol-7-sulphonic acid and 1:8-dihydroxy-naphthalene-3:6-disulphonic acid, and $R_3$ and $R_4$ represent hydrogen or a methoxy group, the said dyes dyeing regenerated cellulose in even level shades varying from brown to bluish-red.

4. As new products, the disazo dyes which are capable of dyeing regenerated cellulose materials in even level shades which may be represented by the probable formula

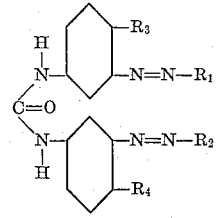

wherein $R_1$ represents the coupled residue of salicylic acid, $R_2$ represents the coupled residue of 2-amino-8-naphthol-6-sulphonic acid or 2-phenylamino-8-naphthol-6-sulphonic acid, and $R_3$ and $R_4$ represent hydrogen or an alkoxy group, the said dyes dyeing regenerated cellulose in yellowish-brown to brown shades.

5. As a new product, the disazo dye which is capable of dyeing regenerated cellulose in even level shades which may be represented by the probable formula

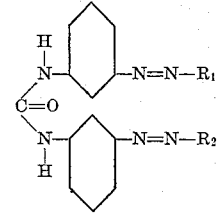

wherein $R_1$ represents the coupled residue of salicylic acid and $R_2$ represents the coupled residue of 2-amino-8-naphthol-6-sulphonic acid, the said dye dyeing regenerated cellulose in yellowish-brown shades.

6. As new products, the disazo dyes which are capable of dyeing regenerated cellulose in even level shades which may be represented by the probable formula

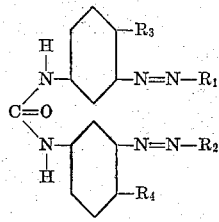

wherein $R_1$ represents the coupled residue of salicylic acid, $R_2$ represents the coupled residue of 2-phenylamino-8-naphthol-6-sulphonic acid, and $R_3$ and $R_4$ represent hydrogen or a methoxy group, the said dyes dyeing regenerated cellulose in brown shades.

7. As a new product, the disazo dye which is capable of dyeing regenerated cellulose in even level shades which may be represented by the probable formula

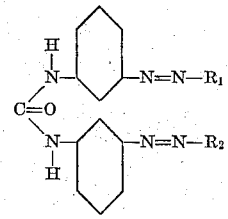

wherein $R_1$ represents the coupled residue of salicylic acid and $R_2$ represents the coupled residue of 2-phenylamino-8-naphthol-6-sulphonic acid; the said dye dyeing regenerated cellulose in brown shades.

8. As new products, disazo dyes which are capable of dyeing regenerated cellulose in even level shades and which may be represented by the probable formula:

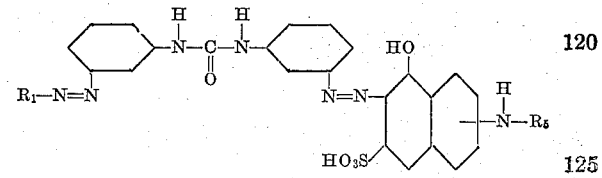

wherein $R_1$ represents the coupled residue of an azo dye coupling component selected from the class consisting of salicylic acid, o-cresotinic acid, 1-naphthol-4-sulphonic acid, and 2-naphthol-7-sulphonic acid and $R_5$ represents a phenyl or benzoyl group, said dyes dyeing regenerated cellulose in brown to bluish-red shades.

9. As new products, disazo dyes which are capable of dyeing regenerated cellulose in even level shades and which may be represented by the probable formula:

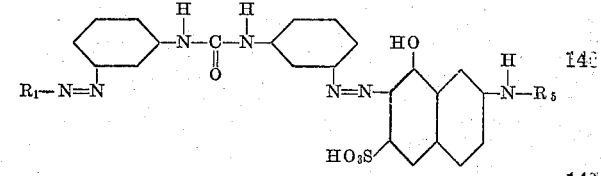

wherein $R_1$ represents the coupled residue of an azo dye coupling component selected from the class consisting of salicylic acid, 1-naphthol-4-sulphonic acid, and o-cresotinic acid and $R_5$ a phenyl or benzoyl group, said dyes dyeing regenerated cellulose in brown to yellowish-pink shades.

10. As new products, disazo dyes which are capable of dyeing regenerated cellulose in even level shades and which may be represented by the probable formula:

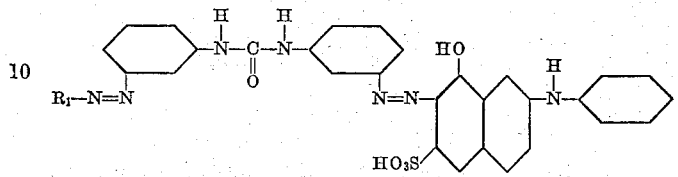

wherein $R_1$ represents the coupled residue of an azo dye coupling component selected from the class consisting of salicylic acid and 1-naphthol-4-sulphonic acid, said dyes dyeing regenerated cellulose in brown shades.

11. As new products, disazo dyes which are capable of dyeing regenerated cellulose in even level shades and which may be represented by the probable formula:

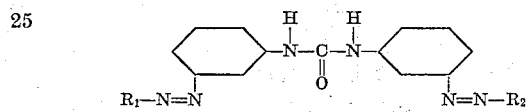

wherein $R_1$ represents a coupled residue of ortho-cresotinic acid and $R_2$ represents the coupled residue of 2-benzoyl-amino-8-naphthol-6-sulphonic acid, said dye dyeing regenerated cellulose in yellowish-pink shades.

RAINALD BRIGHTMAN
WILLIAM LESLIE BABER WELLACOTT.